United States Patent [19]

Naylor et al.

[11] 4,377,149
[45] Mar. 22, 1983

[54] FUEL TEMPERATURE CONTROL SYSTEM

[75] Inventors: Jimmy C. Naylor; Richard G. Norton, both of Hudson, Iowa

[73] Assignee: Deere & Company, Moline, Ill.

[21] Appl. No.: 196,511

[22] Filed: Oct. 14, 1980

[51] Int. Cl.³ ............................................ F02M 31/00
[52] U.S. Cl. ................................. 123/557; 123/510; 123/516
[58] Field of Search ............... 123/557, 552, 510, 514, 123/516

[56] References Cited

U.S. PATENT DOCUMENTS

| | | |
|---|---|---|
| 2,599,699 | 6/1952 | Dilworth ............................ 123/516 |
| 2,881,828 | 4/1959 | McGinnis . |
| 3,472,214 | 10/1969 | Moon . |
| 3,489,128 | 1/1970 | Dinger . |
| 3,628,516 | 12/1971 | Perrin . |
| 3,768,454 | 10/1973 | Markland . |
| 3,893,694 | 7/1975 | Inada . |
| 4,187,813 | 2/1980 | Stumpp ............................. 123/510 |

FOREIGN PATENT DOCUMENTS 3017325  11/1980  Fed. Rep. of Germany ...... 123/514

*Primary Examiner*—Ronald H. Lazarus

[57] ABSTRACT

An improved fuel temperature control system is disclosed for attachment to a diesel engine. The control system comprises a fuel tank, an injection pump and a transfer pump along with associated fuel lines. The transfer pump is designed to draw fuel out of the fuel tank and route it to the injection pump. In the injection pump, a portion of the fuel is directed to the cylinders of the engine while the unused portion is returned via a return line to the fuel tank. In addition to the above, a temperature control means is positioned across the fuel supply line between the transfer pump and the injection pump. This temperature control means contains a temperature sensor interconnected to a temperature compensator valve. The temperature sensor is capable of sensing the temperature of the fuel as it flows through the fuel supply line while the temperature compensator alters the direction of flow of the fuel in response to commands from the temperature sensor. When the sensor signals that the warm unused fuel from the injection pump should be mixed with the cold incoming fuel from the fuel tank, the temperature compensator alters the flow of the fuel through a fuel bypass line. This fuel bypass line connects the temperature control valve to the fuel supply line upstream of the transfer pump. By mixing the warm unused fuel with the incoming cold fuel, one is able to warm up the fuel flowing to the injection pump, thereby providing better ignition and a more balanced horsepower output for the vehicle.

9 Claims, 5 Drawing Figures

FUEL TEMPERATURE CONTROL SYSTEM

FIELD OF THE INVENTION

This invention relates to an improved fuel temperature control system and more particularly to an improved fuel temperature control system for diesel engines.

BACKGROUND OF THE INVENTION

For vehicles with diesel engines, it has always been advantageous to preheat the cold fuel coming from the fuel tank before its introduction to the injection pump. Two reasons for warming up the fuel are that first, cold fuel is more viscous and tends to produce more horsepower. This extra horsepower becomes detrimental to the components of an engine when it exceeds the rate capacity of the engine. Secondly, a more noticeable problem is that with cold fuel, the operator experiences an increase in horsepower from his vehicle. As the fuel warms up as the vehicle is operated, the operator experiences a decrease in horsepower. Since this decrease in power is gradual, the operator tends to believe it is due to some malfunctioning of his equipment.

In order to warm up the fuel, various vehicle manufacturers have tried several different approaches. One system includes the use of using the water jacket of the engine to preheat the fuel. Once the water is heated by the combustion in the cylinders, the heat is transferred, such as by a heat exchanger, to warm up the fuel. A second approach uses a separate heater to preheat the fuel. A third solution is taught in U.S. Pat. No. 3,768,454, issued to Markland in Oct. 1973, entitled "Fuel Heater". This patent teaches the use of a fuel tank with a confined mixing zone and the use of a temperature sensitive proportional valve means. The valve is responsive only to the temperature of the fuel at the inlet of the feed line for dividing the flow of the fluid from the return line to the first and second inlets of the fuel tank means. By re-routing and mixing the fuel within the fuel tank, Markland is able to heat up the incoming fuel. A fourth solution appears in U.S. Pat. No. 2,881,828, issued to McGinnis in April 1959, entitled "Apparatus for Controlling the Operating Temperature of a Diesel Motor Fuel System Fluid". This patent teaches the use of a temperature sensitive thermostat in conjunction with a heat exchanger. In this system, warm unused fuel from the injection pump is circulated about a coiled fuel supply line to heat up the incoming fuel. If additional heat is needed, the warm fuel is then intermixed with the incoming cold fuel. These and other attempts to solve the problem of warming up the incoming fuel have not totally resolved the problem mainly because of their inability to quickly and effectively transfer the desired amount of heat to the incoming fuel. The present invention solves this troublesome problem by providing an improved fuel temperature control system.

The general object of this invention is to provide an improved fuel temperature control system for a vehicle. A more specific object of this invention is to provide a fuel temperature control system for attachment to a vehicle having a diesel engine.

Another object of this invention is to provide a fuel temperature control system which is capable of quickly bringing the cold incoming fuel up to a predetermined temperature value.

Still another object of this invention is to provide an inexpensive fuel temperature control system for diesel engines.

A further object of this invention is to provide a fuel temperature control system which will quickly supply a source of heat to the cold incoming fuel.

Other objects and advantages of this invention will become more apparent from a reading of the following description and the drawings.

SUMMARY OF THE INVENTION

Briefly, this invention relates to an improved fuel temperature control system for use on vehicles having diesel engines. The fuel control system includes several elements, including a fuel tank, a transfer pump, a temperature control means, an injection pump, filters and supply lines. The control system functions as follows: cold fuel contained in the fuel tank is drawn out through a fuel supply line by a transfer pump. The transfer pump routes the fuel to an injection pump which supplies the fuel to the separate cylinders of the engine. The injection pump employs a gallery and plunging mechanism such as is known to the art, in which approximately half of the fuel is supplied to the different combustion cylinders while the remaining fuel is either re-routed to the fuel tank or used to warm up the incoming fuel. The unused fuel is raised in temperature within the injection pump by the action of the gallery and plunging mechanism.

The improved fuel control system provides a means for re-routing this unused heated fuel through a temperature control means which comprises a temperature sensor interconnected to a fluid control valve. The temperature sensor is positioned across a fuel supply line between the transfer pump and the injection pump and is capable of sensing the temperature of the incoming fuel. When this temperature is below a predetermined temperature value, the sensor will relay a signal to the fluid control valve to divert either a portion of or all of the warm, unused fuel flowing in the return line. This warm fuel is then routed through a fuel bypass line to an upstream position of the transfer pump. As the warm, unused fuel mixes with the cold incoming fuel from the fuel tank, it causes the temperature of the mixture to rise. As the mixture approaches the predetermined temperature value, the temperature sensor will instruct the fluid control valve to adjust the flow of the unused, heated fuel so that the predetermined temperature value can be maintained. The portion of the warm fuel which is not used is returned back to the fuel tank.

In addition to the above-mentioned elements, a shutoff valve can be employed which is positioned across the fuel supply line, upstream of the transfer pump, which acts to prevent fuel from flowing to the injection pump once the engine is turned off. This shutoff valve diverts the flow of the incoming fluid that would normally pass from the fuel tank to the transfer pump and also recirculates the fuel in the fuel supply line which was destined for the injection pump.

DETAILED DESCRIPTION OF THE PREFERRED EMBODIMENTS

Figure 1:
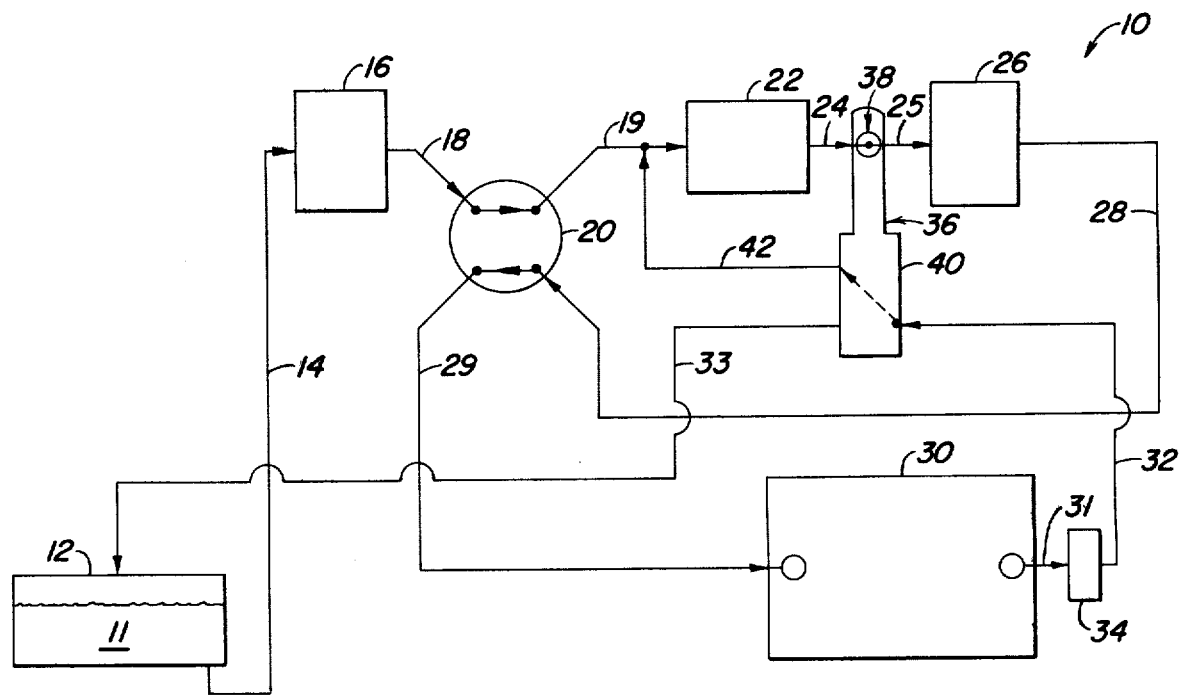
FIG. 1 shows a flow diagram of the improved fuel temperature control system when the engine is in the run mode and the incoming fuel is cold.

FIG. 1 shows an improved fuel temperature control system 10 designed for attachment to a vehicle having a diesel engine wherein the diesel engine is in a run mode and fuel in a fuel tank is cold. The improved fuel temperature control system 10 comprises a fuel tank 12 which is capable of holding a quantity of diesel fuel 11. The fuel 11 is directed out of the fuel tank 12 through a fuel supply line 14 to a prefilter 16. The prefilter 16 is designed to remove essentially all the water which may be present in the fuel 11. From the prefilter 16, the fuel 11 is directed through a shutoff valve 20 to a transfer pump 22 via fuel supply lines 18 and 19, respectively. The transfer pump 22 can be any type of fuel pump which is capable of drawing or urging the fuel 11 out of the fuel tank 12. From the transfer pump 22, the fuel 11 is routed to a fuel filter 26 via fuel supply lines 24 and 25, respectively. The fuel filter 26 is capable of filtering out any contaminants including water which may still be present in the fuel 11. From the fuel filter 26, the fuel is routed through a fuel supply line 28 which passes through the shutoff valve 20. From the shutoff valve 20, the fuel 11 is routed via a fuel supply line 29 into an injection pump 30.

The injection pump 30 can be any type of conventional injection pump which uses a gallery and plunging mechanism (not shown) to distribute the fuel 11 to each cylinder of the engine. Such gallery mechanisms employ plungers which direct only a portion of the fuel 11 to each cylinder of the engine. Preferably, approximately half of the fuel 11 is directed to the cylinders of the engine and the remaining half of the fuel 11 is not used. The unused portion of the fuel 11 is heated up by the reciprocative action of the plungers within the gallery mechanism. This unused, heated fuel 11 leaves the injection pump 30 via return line 31 and enters a check valve 34. The check valve 34 prevents the unused fuel 11 from flowing back into the injection pump 30.

From the check valve 34, the unused, heated fuel 11 is routed through a return line 32 into a temperature control means 36. The temperature control means 36 is positioned across both of the fuel supply lines 24 and 25 and the fuel return line 32 and is comprised of a temperature sensor 38 interconnected to a fluid control valve 40. The temperature sensor 38 is positioned across the fuel supply lines 24 and 25 and is capable of sensing the temperature of the passing fluid 11. The temperature sensor 38 is capable of manipulating the fluid control valve 40, depending on the temperature of the fuel which it senses. The fluid control valve 40, in turn, controls the the direction of the flow of the unused, heated fuel 11 in the return line 32. Preferably, the fluid control valve 40 is a bi-directional control valve such as a spool valve.

The fluid control valve 40 can direct the unused, heated fuel 11 either through a return line 33 back into the fuel tank 12 or through a fuel bypass line 42 which is connected to the fuel supply line 19, located upstream of the transfer pump 22. Because the fluid control valve 40 is a regulatory valve, it is capable of supplying either a portion of the flow or the complete flow through either line.

Figure 2:
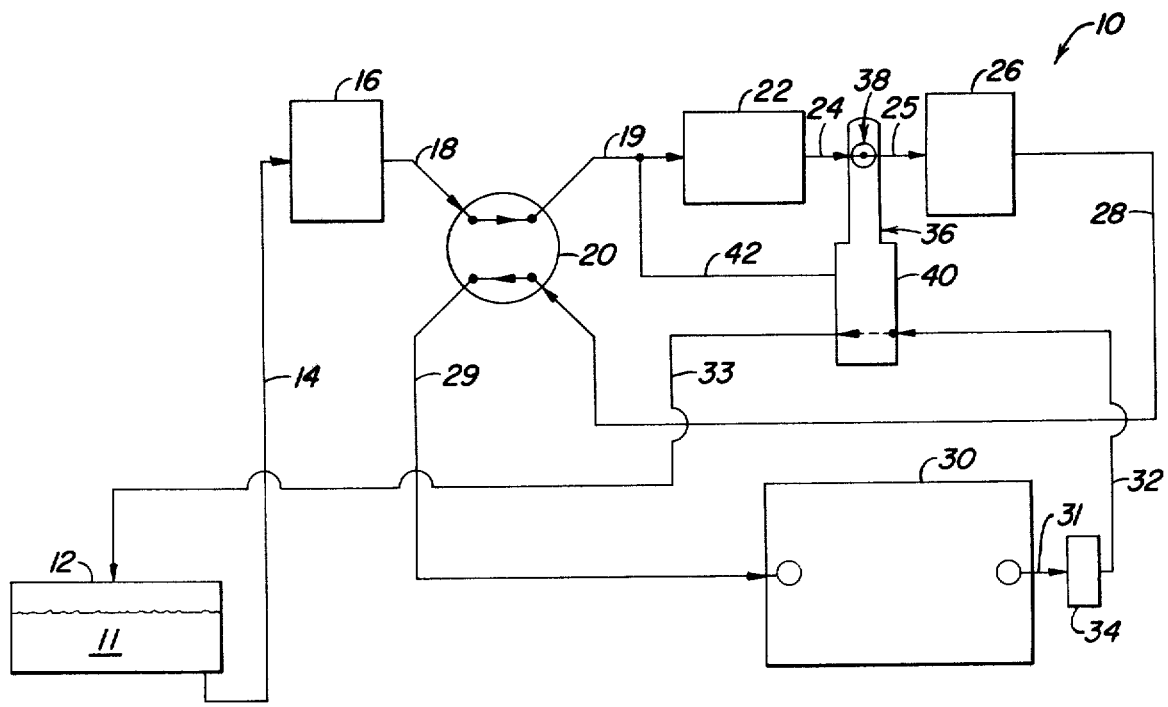
FIG. 2 shows a flow diagram of the improved fuel temperature control system when the engine is in the run mode and the incoming fuel is warm.

Referring now to FIG. 2, a flow diagram is shown for a vehicle having a diesel engine in which the fuel 11 is warm and the engine is running. Such will be the case after the vehicle has been operated for a period of time. In this case, the fluid control valve 40 is positioned so as to direct the unused, heated fuel 11 in the return line 32 to the return line 33 and then back to the fuel tank 12. No intermixing of the fuel is necessary.

Figure 3:
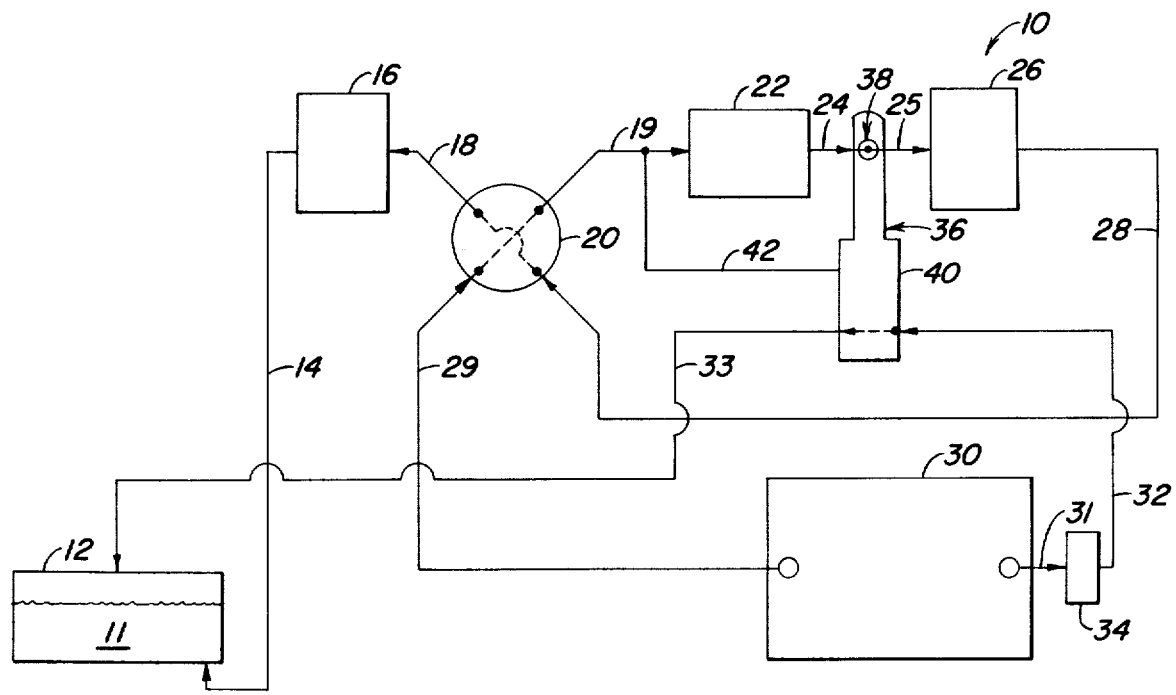
FIG. 3 shows a flow diagram when the engine is stopped and the fuel present in the fuel tank is warm.

Referring to FIG. 3, a flow diagram is shown for a vehicle having an engine which is not running but with warm fuel. Such a situation occurs when a vehicle which has been running is turned off. In this case, the flow direction of the fuel 11 is changed by the shutoff valve 20 and the fuel 11 in the fuel supply line 28 is directed back through the fuel supply lines 18 and 14 into the fuel tank 12. In addition, the fuel 11 contained in the fuel supply line 29 is directed back in a reverse direction through the shutoff valve 20, the transfer pump 22 and into the fuel tank 12. This action starves the injection pump 30 of the fuel 11 and causes the engine to stop.

Figure 4:
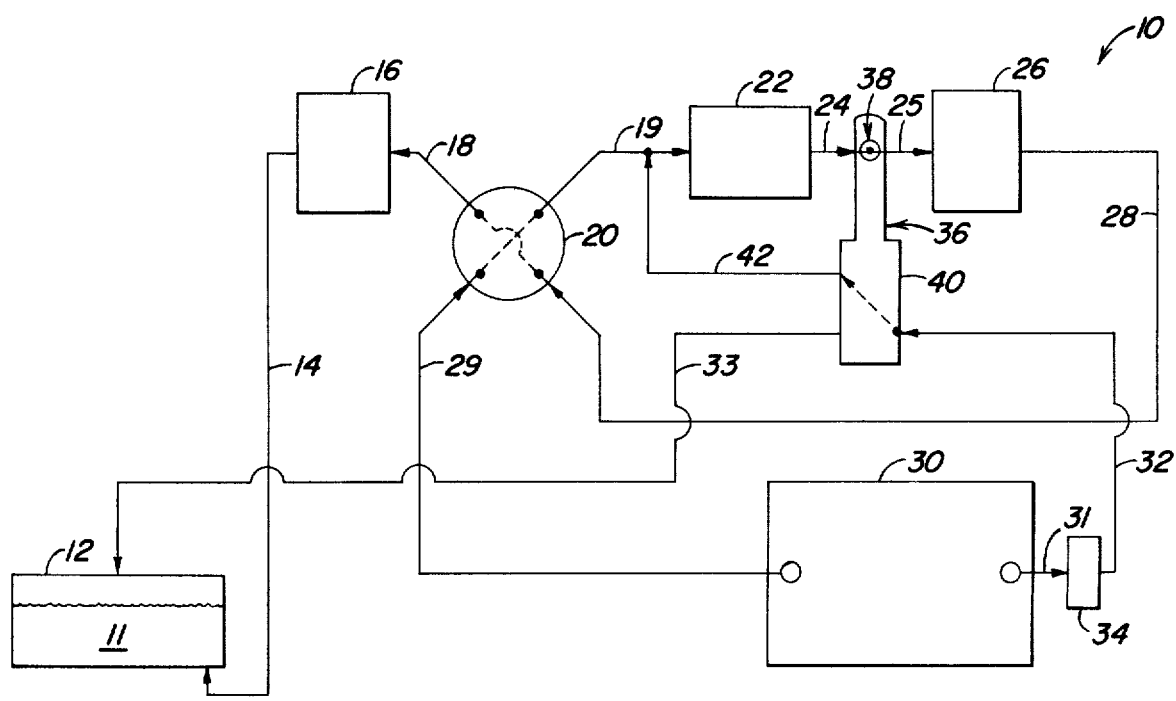
FIG. 4 shows a flow diagram when the engine is stopped and the fuel present in the fuel tank is cold.

In FIG. 4, a flow diagram is shown for a vehicle having a non-running engine and cold fuel 11 in the fuel tank 12. Such will be the case when a vehicle has been standing idle for an extended period of time, for example, overnight. In this case, the fluid control valve 40 directs all of the unused, heated fuel 11 from the injection pump 30 via return line 32 and the fuel bypass line 42 to an upstream position of the transfer pump 22. In addition, the shutoff valve 20 is positioned so as to route all of the fuel 11 contained in the fuel line 29 back to the fuel tank 12.

Figure 5:
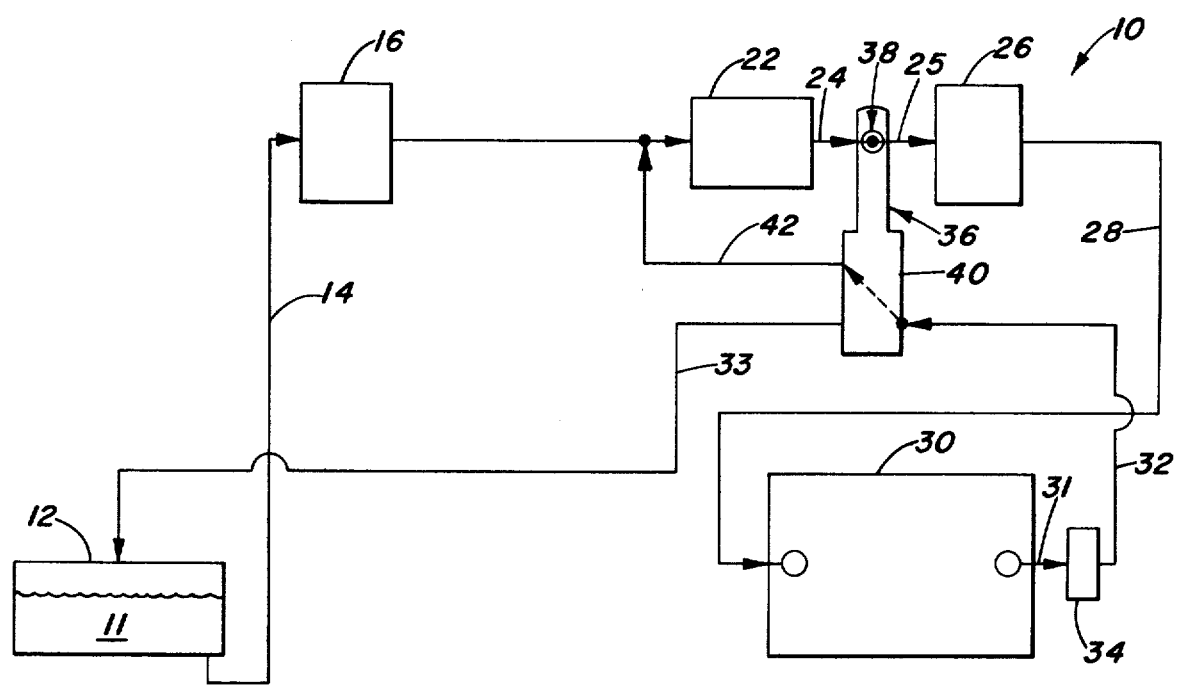
FIG. 5 shows a flow diagram of the improved fuel temperature control system without a shutoff valve.

And lastly, FIG. 5 is a flow diagram showing the improved fuel temperature control system without the shutoff valve 20.

While the invention has been described in conjunction with a specific embodiment having four different positions, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. An improved fuel temperature control system for attachment to a diesel engine which comprises:
   (a) a fuel tank capable of holding a fuel;
   (b) an injection pump capable of supplying said fuel to each cylinder of said diesel engine, said injection pump having a gallery mechanism which limits the amount of said fuel which is supplied to each cylinder;
   (c) a fuel supply line connecting said fuel tank to said injection pump;
   (d) a transfer pump positioned across said fuel supply line capable of drawing said fuel out of said fuel tank;
   (e) a fuel return line connecting said injection pump to said fuel tank for routing unused fuel back to said fuel tank;
   (f) a check valve positioned across said fuel return line for preventing said unused fuel from flowing back into said injection pump;
   (g) a shut-off valve positioned across said fuel supply line and operable to conduct fuel from said fuel tank via said transfer pump to said injection pump when said engine is running and to conduct fuel from said injection pump via said transfer pump to said fuel tank when said engine is stopped;

(h) temperature control means positioned across said fuel supply line between said transfer pump and said injection pump, said temperature control means comprising a temperature sensor interconnected to a fluid control valve, said temperature sensor capable of sensing the temperature of said fuel flowing in said fuel supply line and said fluid control valve capable of altering the direction of flow of said unused fuel in said fuel return line; and (i) a fuel bypass line connecting said fluid control valve to said fuel supply line upstream of said transfer pump, said fuel bypass line capable of routing said unused fuel from said fluid control valve to said fuel supply line for warming up said fuel flowing to said injection pump.

2. The improved system of claim 1 wherein said first control valve is a bi-directional control valve.

3. The improved system of claim 2 wherein said bi-directional control valve is a spool valve.

4. The improved system of claim 1 wherein said fluid control valve diverts the flow of said unused fuel from said fuel return line to said fuel supply line via said fuel bypass line when said fuel in said fuel supply line is below a predetermined temperature value.

5. An improved fuel temperature control system for attachment to a diesel engine which comprises:

(a) a fuel tank capable of holding a fuel;
(b) an injection pump capable of supplying said fuel to each cylinder of said diesel engine, said injection pump having a gallery mechanism which limits the amount of said fuel which is supplied to each cylinder;
(c) a fuel supply line connecting said fuel tank to said injection pump;
(d) a transfer pump positioned across said fuel supply line capable of drawing said fuel out of said fuel tank;
(e) a pre-filler positioned across said fuel supply line between said fuel tank and said transfer pump capable of removing contaminants from said fuel;
(f) a fuel filter positioned across said fuel supply line between said transfer pump and said injection pump capable of filtering contaminants from said fuel;
(g) a fuel return line connecting said injection pump to said fuel tank for routing unused fuel from said injection pump to said fuel tank;
(h) a check valve positioned across said fuel return line for preventing said unused fuel from flowing back into said injection tank;
(i) a shut-off valve positioned across said fuel supply line and operable to conduct fuel from said fuel tank via said transfer pump to said injection pump when said engine is running and to conduct fuel from said injection pump via said transfer pump to said fuel tank when said engine is stopped;
(j) temperature control means positioned across both said fuel supply line and said fuel return line, said temperature control means comprising a temperature sensor interconnected to a bi-directional control valve, said temperature sensor capable of sensing the temperature of said fuel flowing in said fuel supply line and said bi-directional control valve capable of diverting the direction of flow of said unused fuel in said fuel return line; and
(k) a fuel bypass line connecting said bi-directional control valve to said fuel supply line upstream of said transfer pump, said fuel bypass line capable of recirculating said unused fuel from said bi-directional control valve to said fuel supply line for warming up said fuel flowing to said injection pump.

6. The improved system of claim 5 wherein said shut-off valve is an electric shutoff valve.

7. The improved system of claim 5 wherein said bi-directional control valve is a spool valve.

8. The improved system of claim 5 wherein said temperature sensor utilizes temperature sensitive wax which expands with increases in temperature to physically actuate said bi-directional control valve.

9. An improved fuel temperature control system for attachment to a tractor having a diesel engine, said control system comprising:

(a) a fuel tank capable of holding a diesel fuel;
(b) an injection pump capable of supplying said diesel fuel to each cylinder of said diesel engine, said injection pump having gallery and plunger for each cylinder which limits the amount of fuel which is supplied to each cylinder;
(c) a fuel supply line connecting said fuel tank to said injection pump;
(d) a transfer pump positioned across said fuel supply line capable of drawing said diesel fuel out of said fuel tank;
(e) a pre-filter positioned across said fuel supply line between said fuel tank and said transfer pump, said pre-filter capable of removing water from said diesel fuel;
(f) a fuel filter positioned across said fuel supply line between said transfer pump and said injection pump, said fuel filter capable of filtering contaminants out of said diesel fuel;
(g) a fuel return line connecting said injection pump to said fuel tank for routing unused fuel from said injection pump to said fuel tank;
(h) a check valve positioned across said fuel return line capable of preventing said unused fuel from flowing back into said injection pump;
(i) an electric shut-off valve positioned across said fuel supply line and operable to conduct fuel from said fuel tank via said transfer pump to said injection pump when said engine is running and to conduct fuel from said injection pump via said transfer pump to said fuel tank when said engine is stopped;
(j) temperature control means positioned across both said fuel supply line and said fuel return line, said temperature control means comprising a temperature sensor interconnected to a bi-directional spool valve, said temperature sensor capable of sensing the temperature of said diesel fuel flowing in said fuel supply line and said bi-directional spool valve capable of diverting the direction of flow of said unused fuel in sid fuel return line; and
(k) a fuel bypass line connecting said bi-directional spool valve to said fuel supply line upstream of said transfer pump, said fuel bypass line capable of recirculating unused fuel from said bi-directional spool valve to said fuel supply line for warming up said fuel flowing to said injection pump.

* * * * *